United States Patent
Aoki et al.

(10) Patent No.: US 10,646,864 B2
(45) Date of Patent: May 12, 2020

(54) SYSTEMS, METHODS, AND DEVICES FOR DETECTING SUBSTANCES IN A SAMPLE COLLECTION WELL

(71) Applicant: Konica Minolta, Inc., Chiyoda-ku, Tokyo (JP)

(72) Inventors: Youichi Aoki, Saitama (JP); Masataka Matsuo, Tokyo (JP); Tetsuya Noda, Tokyo (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 17 days.

(21) Appl. No.: 16/073,353

(22) PCT Filed: Jan. 29, 2016

(86) PCT No.: PCT/JP2016/052589
§ 371 (c)(1),
(2) Date: Jul. 27, 2018

(87) PCT Pub. No.: WO2017/130369
PCT Pub. Date: Aug. 3, 2017

(65) Prior Publication Data
US 2019/0033183 A1 Jan. 31, 2019

(51) Int. Cl.
*B01L 3/02* (2006.01)
*G01N 35/10* (2006.01)
(Continued)

(52) U.S. Cl.
CPC .............. *B01L 3/0293* (2013.01); *B01L 3/508* (2013.01); *G01N 35/10* (2013.01);
(Continued)

(58) Field of Classification Search
CPC .......... G01N 35/10; G01N 2035/00277; B01L 3/0289; B01L 3/0293; B01L 2200/0621
See application file for complete search history.

(56) References Cited

U.S. PATENT DOCUMENTS 8,163,239 B2 * 4/2012 Fujita ................... G01N 35/026
422/50
2011/0020178 A1 1/2011 Clinton et al.
(Continued)

FOREIGN PATENT DOCUMENTS

JP 02-243960 9/1990
JP 2005-069902 3/2005
(Continued)

OTHER PUBLICATIONS

International Search Report issued in parent PCT Application No. PCT/JP2016/052589, dated Apr. 19, 2016.
(Continued)

*Primary Examiner* — Justin N Olamit
(74) *Attorney, Agent, or Firm* — BakerHostetler

(57) ABSTRACT

The purpose of the present invention is to provide a detection method which can safely recover a remaining sample from a detection device without causing a biological disaster. In order to achieve at least one of these goals, this detection method involves: a sample collection step for collecting a sample from the sample holding well, and transferring the same to a detection chip; a detection step for detecting the detected substance captured in the detection chip by means of a detection unit; and, after the sample collection step, a remaining sample recovery step for collecting the sample remaining in the sample holding well and transferring this to a sample recovery well. At that time, after the remaining sample recovery step, the surface area of the opening in the sample recovery well is smaller than the surface area of the opening in the sample holding well.

10 Claims, 10 Drawing Sheets

(51) Int. Cl.
  B01L 3/00 (2006.01)
  *G01N 35/00* (2006.01)
  *G01N 35/04* (2006.01)
  *G01N 21/11* (2006.01)
  *G01N 21/64* (2006.01)
  *G01N 1/00* (2006.01)

(52) U.S. Cl.
  CPC .... *G01N 35/1011* (2013.01); *B01L 2300/044* (2013.01); *G01N 21/11* (2013.01); *G01N 21/648* (2013.01); *G01N 35/00029* (2013.01); *G01N 35/1016* (2013.01); *G01N 2001/002* (2013.01); *G01N 2035/00158* (2013.01); *G01N 2035/00237* (2013.01); *G01N 2035/00277* (2013.01); *G01N 2035/0403* (2013.01); *G01N 2035/0436* (2013.01); *G01N 2035/102* (2013.01); *G01N 2035/1025* (2013.01)

(56) References Cited

U.S. PATENT DOCUMENTS

| | | |
|---|---|---|
| 2013/0016564 A1 | 1/2013 | Ferragina et al. |
| 2013/0165643 A1 | 6/2013 | Akashi et al. |

FOREIGN PATENT DOCUMENTS

| | | |
|---|---|---|
| JP | 2007-175005 | 7/2007 |
| JP | 2008-051607 | 3/2008 |
| JP | 2010-164378 | 7/2010 |
| JP | 2013-092490 | 5/2013 |
| WO | 2011/040197 | 9/2010 |

OTHER PUBLICATIONS

Japan Patent Application No. 2017-563487; Notice of Reasons for Refusal; dated Sep. 10, 2019; 8 pages.

International Patent Application No. PCT/JP2016/052589; Int'l Preliminary Report on Patentability; dated Aug. 9, 2018; 10 pages.

Extended European Search Report issued in corresponding EP Application No. 16887956.7 dated Feb. 4, 2019.

Japan Patent Application No. 2017-563487; Notice of Reasons for Refusal; dated Dec. 10, 2019; 6 pages.

Isuke Ouchi; "Mechanical properties of flexible thin film media"; Journal of Japan Applied Magnetism; vol. 17 supplement, No. S2; 1993; p. 274-279 (contains English Abstract).

Japan Patent Application No. 2017-563487; Decision of Refusal; dated Mar. 10, 2020; 7 pages.

* cited by examiner

SYSTEMS, METHODS, AND DEVICES FOR DETECTING SUBSTANCES IN A SAMPLE COLLECTION WELL

CROSS-REFERENCE TO PRIOR APPLICATIONS

This application is a 371 national stage application of PCT/JP2016/052589 filed Jan. 29, 2016, the entire disclosure of which is referenced herein in its entirety.

TECHNICAL FIELD

The present invention relates to a detection method and a detection system for detecting existence or an amount of a detection target substance in a sample, and a detection apparatus to be used in the detection method.

BACKGROUND ART

In a clinical examination, for example, if a minute amount of detection target substance such as protein or DNA contained in a sample can be quantitatively detected with high sensitivity, a condition of a patient can quickly be recognized for treatment. Therefore, various detection apparatuses for quantitatively detecting a minute amount of detection target substance with high sensitivity have been developed.

In such a detection apparatus, normally, a user himself/herself introduces a sample into a container for receiving a sample (hereinafter also referred to as "sample holding well"), the container being set inside the detection apparatus. After the end of detection target substance detection, a sample (remaining sample) not used for the detection target substance detection and the sample holding well that holds the sample are removed from the detection apparatus and disposed of by the user. From the perspective of introduction of a sample, it is preferable that the sample holding well include a large opening. However, if the area of the opening of the sample holding well is large, a sample sometime spills or splatters from the opening part of the sample holding well when the sample holding well is removed from the detection apparatus or moved. Therefore, there has been a demand for provision of a method, a detection system and a detection apparatus that allow safe collection of a remaining sample and a sample holding well.

In response to such demand, detection apparatuses each including a mechanism that automatically collects a remaining sample and a sample holding well have been proposed (PTL 1 and PTL 2). Also, attaching a disposal box for disposing of all parts in contact with a sample to a detection apparatus has been proposed (PTL 3).

CITATION LIST

Patent Literatures

PTL 1: International Publication No. WO 2011/040197
PTL 2: Japanese Patent Application Laid-Open No. 2010-164378
PTL 3: Japanese Patent Application Laid-Open No. 2008-051607

SUMMARY OF INVENTION

Technical Problem

However, provision of a mechanism that collects a remaining sample and a sample holding well into a detection apparatus as described in PTL 1 and PTL 2 indicated above causes the problem of increase in size and cost of the apparatus. Also, in the case of attachment of a disposal box in PTL 3 indicated above, e.g. a space for setting the disposal box is needed on the detection apparatus side, and thus, there is a demand for easier collection of a remaining sample and a sample holding well.

On the other hand, it is conceivable that after detection target substance detection, a user himself/herself puts a closure on a sample holding well or seals the opening part of the sample holding well to remove the sample holding well from the detection apparatus. However, such method has the problem of increase in burden on the user.

In response to such problem, there is a demand for provision of a detection method, a detection system and a detection apparatus enabling a remaining sample to be safely collected from a detection apparatus without causing a biohazard.

Solution to Problem

As a result of diligent study, the present inventors found that a remaining sample, etc., can safely be collected without attachment of special devices and members, by harvesting a remaining sample remaining in a sample holding well after harvesting of a sample, via a liquid harvesting section, and moving the remaining sample to a sample collection well having a smaller opening area.

A detection method according to an embodiment of the present invention includes: a sample harvesting step of harvesting a sample from a sample holding well that holds a sample and moving the sample to a detection chip that captures a detection target substance contained in the sample, via a liquid harvesting section; a detection step of detecting the detection target substance captured by the detection chip, via a detection section; and a remaining sample collection step of after the sample harvesting step, harvesting a remaining sample from the sample holding well and moving the remaining sample to a sample collection well via the liquid harvesting section, in which after the remaining sample collection step, an opening area of an opening part provided in the sample collection well is smaller than an opening area of an opening part included in the sample holding well.

A detection system according to an embodiment of the present invention includes: a sample holding well that holds a sample; a sample collection well that collects a remaining sample from the sample holding well; a liquid harvesting section that harvests a sample from the sample holding well; a detection chip that captures a detection target substance contained in the sample; a detection section that detects the detection target substance captured by the detection chip, in which a remaining sample in the sample holding well after harvesting of the sample from the sample holding well and provision of the sample to the detection chip by the liquid harvesting section is harvested and collected into the sample collection well by the liquid harvesting section including an opening part, an opening area of the opening part being smaller than an opening area of an opening part of the sample holding well.

A detection apparatus according to an embodiment of the present invention includes: a holder capable of holding a detection cartridge including a sample holding well that holds a sample, a sample collection well that collects a remaining sample from the sample holding well and a detection chip that captures a detection target substance contained in a sample; a detection section that detects the detection target substance captured by the detection chip held by the holder; a liquid harvesting section that harvests a sample from the sample holding well; and a control section that controls the liquid harvesting section, in which the control section controls the liquid harvesting section to harvest a sample held in the sample holding well and provide the sample to the detection chip and then harvest a remaining sample in the sample holding well and provide the remaining sample to the sample collection well including an opening part, an opening area of the opening part being smaller than an opening area of an opening part of the sample holding well.

Advantageous Effects of Invention

The detection method, the detection system and the detection apparatus according to the present invention enable collecting a remaining sample and a sample holding well that holds the remaining sample to be safely collected from a detection apparatus without causing a biohazard.

DESCRIPTION OF EMBODIMENTS

Embodiments of the present invention will be described below with reference to the accompanying drawings. In the below, a detection system and a detection apparatus according to an embodiment of the present invention will be described, and then a detection method according to an embodiment of the present invention will be described.

(Detection system and detection apparatus)

In the below, an apparatus utilizing surface plasmon resonance fluorescence spectroscopy (surface plasmon-field enhanced fluorescence spectroscopy, hereinafter abbreviated as "SPFS") (hereinafter also referred to as "SPFS apparatus") will be described as a representative example of a detection apparatus; however, the detection apparatus, the detection system and the detection method according to the present invention are not limited to an SPFS apparatus or a detection method using the SPFS apparatus.

Figure 1:
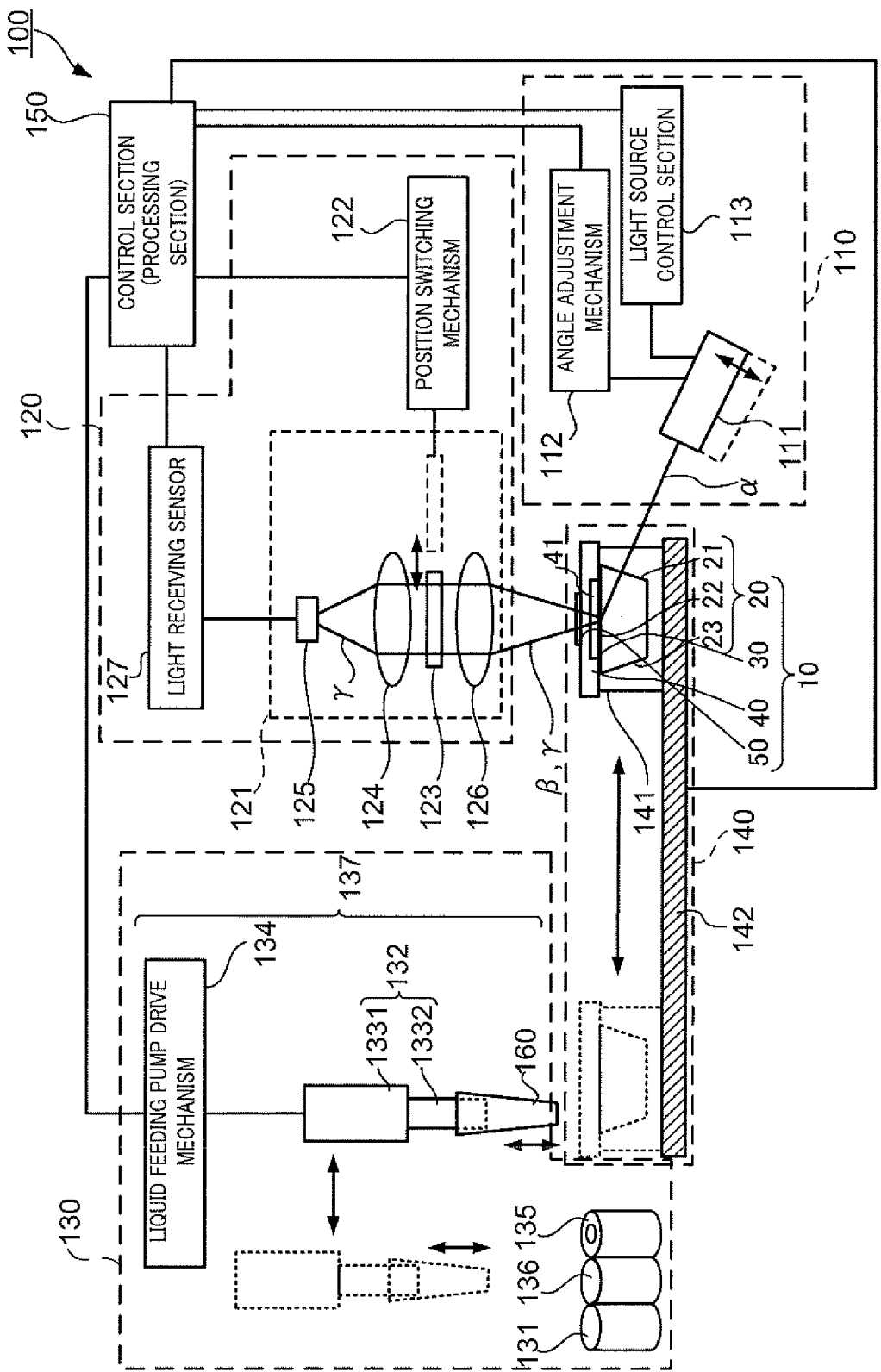
FIG. 1 is a schematic diagram illustrating a configuration of a detection apparatus (SPFS apparatus) according to an embodiment of the present invention.

FIG. 1 is a diagram illustrating a configuration of SPFS apparatus 100 (detection system) according to an embodiment of the present invention. As illustrated in FIG. 1, SPFS apparatus 100 includes light irradiation unit 110 for applying light to detection chip 10, light receiving detection unit 120 for detecting fluorescence γ released from detection chip 10, liquid feeding unit 130 for feeding a sample or any of various chemicals to detection chip 10, conveyance unit 140 for conveying detection chip 10, and control section 150 for controlling these components. In the present embodiment, detection chip 10 and some parts (e.g., sample holding well 131, sample collection well 135 and chemical well 136) of liquid feeding unit 130 are formed so as to be removable from the detection apparatus. In the present description, the detection apparatus, detection chip 10, sample holding well 131, sample collection well 135 and chemical well 136, etc., are collectively referred to as a "detection system". Also, in FIG. 1, detection chip 10, sample holding well 131, sample collection well 135 and chemical well 136 are illustrated as separate members, but these components may be integrated as a single member (detection cartridge). In the below, liquid feeding unit 130 will be described first, and then, other components of SPFS apparatus 100 will be described.

Figure 2:
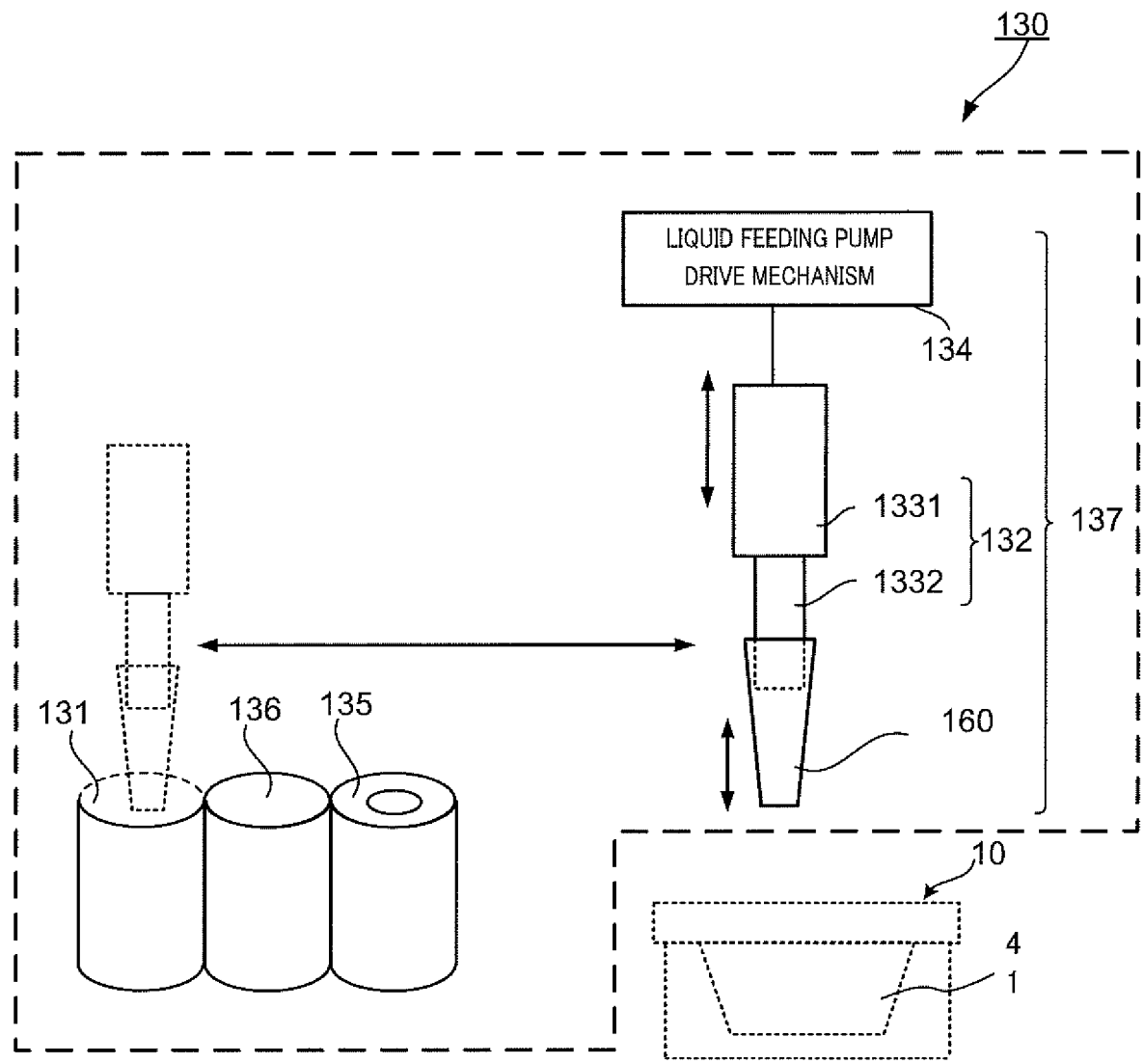
FIG. 2 is a schematic diagram illustrating a configuration of a liquid feeding unit in a detection apparatus according to an embodiment of the present invention.

FIG. 2 illustrates a configuration of liquid feeding unit 130 according to the present embodiment. Liquid feeding unit 130 includes sample holding well 131, sample collection well 135, chemical well 136, pump 132, pipette chip 160 and liquid feeding pump drive mechanism 134. Pump 132, pipette chip 160 and liquid feeding pump drive mechanism 134 are also collectively referred to as "liquid harvesting section 137".

Liquid feeding unit 130 is a unit for supplying, e.g., a sample, a labelling liquid or a cleaning liquid to liquid receiving section 41 of detection chip 10 set in later-described conveyance unit 140 or collecting the sample or liquid from liquid receiving section 41. Liquid feeding unit 130 is also a unit for moving an excess sample (remaining sample) remaining in sample holding well 131 or a liquid collected from detection chip 10 to sample collection well 135.

Sample holding well 131 is a container for a user to inject a sample thereinto via, e.g., a pipette (not illustrated). Sample holding well 131 includes an inner space for receiving a sample, and an opening large enough for a user to insert, e.g., a pipette thereinto to inject a sample or for liquid harvesting section 137 to insert pipette chip 160 thereinto to harvest a sample. Also, sample holding well 131 is set so as to be removable from detection apparatus 100 and be replaced for each detection target substance detection. Sample holding well 131 is generally a container formed of a resin and may be transparent or opaque.

Chemical well 136 is a container that receives a chemical such as a labeling liquid or a cleaning liquid. Chemical well 136 includes an inner space for receiving a chemical, and an opening for a user to insert, e.g., a pipette thereinto to inject a chemical or for liquid harvesting section 137 to insert pipette chip 160 thereinto to harvest a chemical. A chemical may be charged inside chemical well 136 in advance or may be injected by a user via, e.g., a pipette (not illustrated). Chemical well 136 is set so as to be removable from detection apparatus 100 and is replaced as necessary. Chemical well 136 is generally a container formed of a resin and may be transparent or opaque.

Figure 3A:
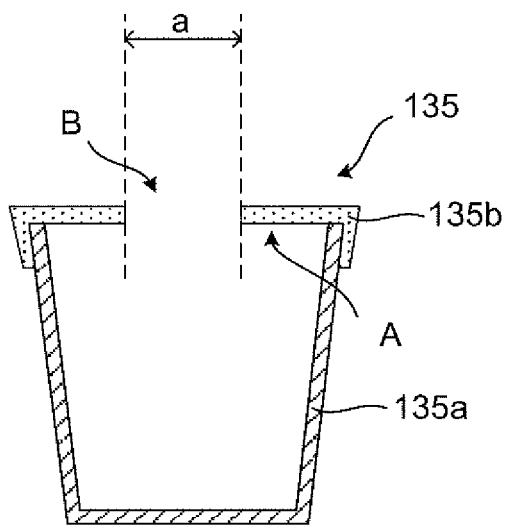
FIG. 3A is a schematic cross-sectional view of an example sample collection well for a detection apparatus according to an embodiment of the present invention.

Sample collection well 135 is a container that receives, e.g., an excess sample (remaining sample) remaining in sample holding well 131 or, e.g., a liquid collected from detection chip 10. FIG. 3A is a schematic cross-sectional view of sample collection well 135 in the present embodiment. Sample collection well 135 includes liquid receiving section 135a including opening A, and closure part 135b that covers opening A. Also, a part of closure part 135b includes opening part B formed of a hole or a cut. In the present embodiment, liquid harvesting section 137 inserts pipette chip 160 to opening part B and discharges, e.g., a remaining sample into sample collection well 135.

A shape of liquid receiving section 135a of sample collection well 135 is not specifically limited as long as the shape includes an inner space that can receive, e.g., a remaining sample and also includes opening A on either one side thereof. Liquid receiving section 135a is generally formed of a resin and may be transparent or opaque. Also, liquid receiving section 135a may include an absorbent for absorbing a sample, inside. The absorbent is not specifically limited as long as the absorbent is capable of absorbing a sample, and can be, for example, absorbent cotton, water absorptive polymer or the like.

The closure part 135b of sample collection well 135 only needs to serve a function that suppresses flowing, e.g., a remaining sample received inside liquid receiving section 135a to the outside at the time of collection of sample collection well 135, and in the present embodiment, is formed of a sheet-like member. Closure part 135b may be one molded integrally with liquid receiving section 135a or may be formed so as to be detachable from liquid receiving section 135a. The closure 135b may be bonded to liquid receiving section 135a via, e.g., a double-stick tape or an adhesive, may be welded to liquid receiving section 135a via, e.g., laser welding or an ultrasound welding or may be joined to liquid receiving section 135a using, e.g., a clamp.

Figure 3B:
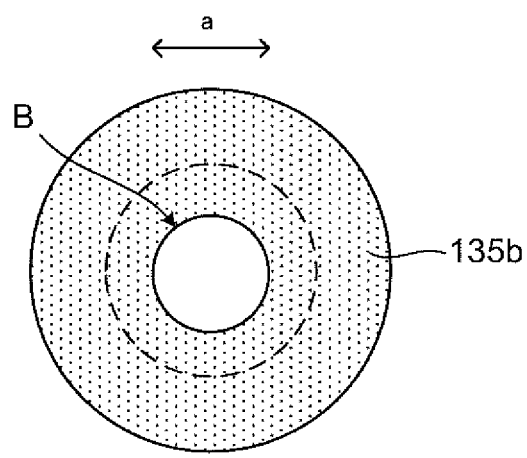
FIG. 3B is a plan view of the sample collection well.
Figure 4A:
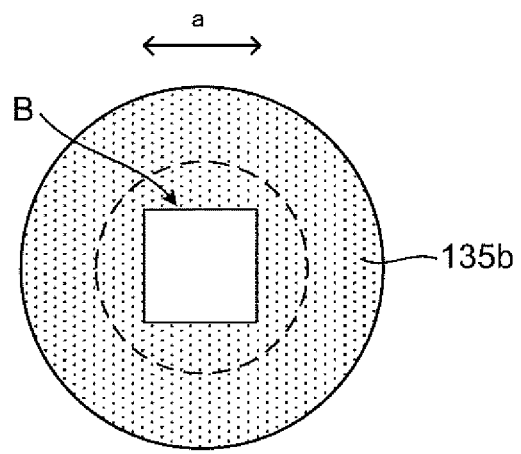
FIGS. 4A and 4B are plan views of other example sample collection wells for a detection apparatus according to an embodiment of the present invention.
Figure 4B:
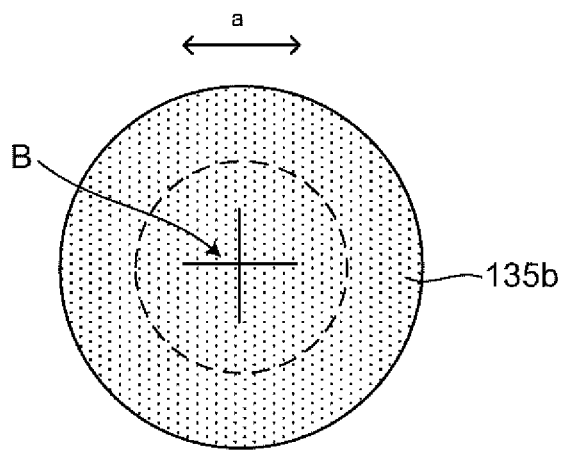

Here, closure part 135b includes opening part B that brings the inner space of liquid receiving section 135a and the outside into communication with each other. In the present embodiment, as illustrated in the plan view in FIG. 3B, opening part B has a round shape; however, the shape of opening part B is not specifically limited, and, for example, as illustrated in the plan views of alterations of closure part 135b in FIGS. 4A and 4B, opening part B may have a rectangular shape or be a cross cut. The opening area of opening part B of sample collection well 135 is smaller than the opening area of the opening part of sample holding well 131. The opening area of opening part B of closure part 135b of sample collection well 135 is preferably no more than 4%, more preferably no more than 2%, of the opening area of the opening part of sample holding well 131. Also, the opening area is preferably no more than 7 mm², more preferably no more than 3 mm². Furthermore, it is preferable that a diameter (length indicated by a in FIGS. 3A and 3B) of the opening part of closure part 135b be smaller than a diameter of the opening part of sample holding well 131. The "diameter of the opening part" mentioned in the present description refers to a maximum value of the diameter of the opening part unless otherwise specified. Also, if the opening part is a cut, the "diameter of the opening part" refers to a maximum value of a diameter of an opening part formed by the cut. Here, opening part B of closure part 135b may be formed before setting of sample collection well 135 in detection apparatus 100 or may be formed by piercing with pipette chip 160 after setting of sample collection well 135 in detection apparatus 100.

Also, the diameter of opening part B included in closure part 135b of sample collection well 135 is preferably no more than 15%, more preferably no more than 10%, of the diameter of the opening part included in sample holding well 131. The diameter of opening part B included in closure part 135b is preferably no more than 3 mm, more preferably no more than 2 mm, from the perspective of prevention of splattering of, e.g., a remaining sample.

A material of closure part 135b is not specifically limited, and closure part 135b may be made of a resin that is the same as or different from that used for liquid receiving section 135a. For example, closure part 135b may be made of, e.g., an elastic sheet. Examples of the elastic sheet include low-density polyethylene (LDPE), linear low-density polyethylene (LLDPE), middle-density polyethylene (HDPE), nylon, cast polypropylene (CPP), ethylene-vinyl alcohol copolymer (EVOH), silicone, polyurethane, polyvinyl alcohol (PVA) and polyvinyl chloride (PVC). Closure part 135b generally has a thickness of 10 to 500 μm. Also, an outer shape and a size of closure part 135b are not specifically limited as long as such outer shape and size enable opening part B to fulfill the aforementioned function.

Figure 5:
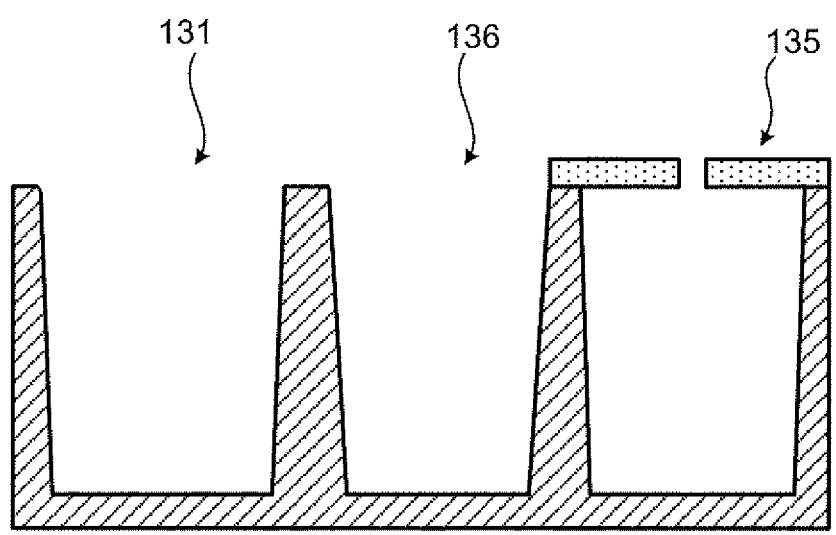
FIG. 5 is a schematic cross-sectional view illustrating a configuration of a sample holding well, a chemical well and a sample collection well for a detection apparatus according to an embodiment of the present invention.

Also, sample holding well 131, chemical well 136 and sample collection well 135 may be integrated, for example, as illustrated in the cross-sectional view in FIG. 5, or may be independent from one another.

Pump 132 included in liquid harvesting section 137 of liquid feeding unit 130 includes plunger pump 1331 and pump nozzle 1332. Plunger pump 1331 includes a syringe and a plunger (neither of which is illustrated), the plunger reciprocates inside the syringe. Reciprocating motion of the plunger allows quantitative liquid feeding (suction and discharge). Pump nozzle 1332 detachably holds pipette chip 160.

Pipette chip 160 detachably held by pump nozzle 1332 has a tapered surface having a larger outer diameter as is farther from a distal end of pipette chip 160 (see FIG. 2). Therefore, it is also possible to, when a remaining sample is to be discharged to sample collection well 135, pierce closure part 135b with pipette chip 160 to form opening part B described above of sample collection well 135. For example, upon pipette chip 160 being inserted from a front surface of closure part 135b of sample collection well 135 toward liquid receiving section 135a of sample collection well 135, pipette chip 160 breaks through closure part 135b. Then, upon pipette chip 160 being inserted even deeper, opening part B of closure part 135b is pushed and expanded by pipette chip 160 and opening part B having a desired area is thereby formed.

Liquid feeding pump drive mechanism 134 included in liquid harvesting section 137 of liquid feeding unit 130 includes a drive device for the plunger and a moving device for pipette chip 160. The drive device for the plunger is a device for causing the plunger to make a reciprocating motion, and in the present embodiment, includes a stepping motor. The drive device including the stepping motor enables management of an amount and a speed of a liquid fed and thus enables management of an amount of remaining liquid in each of detection chip 10 and sample holding well 131. The moving device for pipette chip 160 is capable of moving pipette chip 160, for example, in two directions that are an axial direction of pipette chip 160 (for example, a vertical direction) and a direction intersecting the axial direction (for example, a horizontal direction). The moving device for pipette chip 160 is formed of, for example, a robot arm, a biaxial stage or a vertically movable turntable.

Liquid feeding pump drive mechanism 134 in the present embodiment further includes a suction pressure measuring device that measures suction pressure when a liquid or a gas is sucked from pipette chip 160. Liquid feeding pump drive mechanism 134 including the suction pressure measuring device enables a liquid surface level (amount) of a sample held inside sample holding well 131 to be detected based on suction pressure of pipette chip 160. Therefore, an amount of excess sample (remaining sample) remaining in sample holding well 131 can be estimated, and based on such estimated amount, e.g., the number of times of harvesting a remaining sample from sample holding well 131, and a position (height from the liquid surface) of pipette chip 160 when pipette chip 160 is inserted into sample holding well 131 can be managed.

Liquid harvesting section 137 of detection apparatus 100 according to the present embodiment harvests any of various liquids from sample holding well 131 or chemical well 136 and supplies such liquid to liquid receiving section 41 of detection chip 10. Upon the plunger being moved, the liquid reciprocates inside liquid receiving section 41 and is thus properly stirred inside liquid receiving section 41. Consequently, uniformization of concentration distribution of the liquid and reactions inside liquid receiving section 41 (for example, primary reaction and secondary reaction) can be facilitated. The liquid inside liquid receiving section 41 is sucked again by liquid-feeding pipette chip 160 and discharged to, e.g., sample collection well 135. Repetition of these operations enables capturing a detection target substance in detection chip 10, causing a sample and any of various chemicals to react with each other or cleaning detection chip 10. Finally, a fluorescently labelled detection target substance can be disposed in detection chip 10.

Also, after disposing a detection target substance in detection chip 10, liquid harvesting section 137 of detection apparatus 100 according to the present embodiment harvests a remaining sample remaining in sample holding well 131 once or more times via pipette chip 160 and discharges the remaining sample into sample collection well 135. In the present embodiment, the opening area of opening part B of sample collection well 135 is smaller than the opening area of the opening part of sample holding well 131. Therefore, as a result of a remaining sample being moved to sample collection well 135, when sample holding well 131 or sample collection well 135 is removed from detection apparatus 100 for collection, even if sample collection well 135 is inclined, the remaining sample is less likely to splatter or spill. Here, the number of times of harvesting a remaining sample from sample holding well 131 can be set according to the amount of remaining sample remaining in sample holding well 131.

Detection chip 10 to be used in detection apparatus 100 according to the present embodiment includes prism 20 including light entrance surface 21, film-forming surface 22 and light exit surface 23, metal film 30 formed on film-forming surface 22, and flow channel cover 40 disposed on film-forming surface 22 or metal film 30. Flow channel cover 40 includes a flow channel groove in a surface facing metal film 30, and a space surrounded by film-forming surface 22 or metal film 30 and flow channel cover 40 forms liquid receiving section 41 for receiving a liquid (for example, a sample). Detection chip 10 is normally replaced for each detection target substance detection. Also, detection chip 10 is a structural object, each side of which has a length of preferably several millimeters to several centimeters, but may be a smaller or larger structural object that does not fall under the category of "chip".

Prism 20 included in detection chip 10 is formed of a dielectric body transparent to excitation light cc, and includes light entrance surface 21, film-forming surface 22 and light exit surface 23. Light entrance surface 21 is a surface for making excitation light cc from excitation light irradiation unit 110 enter the inside of prism 20. Also, metal film 30 is formed on film-forming surface 22, and excitation light cc having entered inside prism 20 is reflected by a back surface of metal film 30, more specifically, an interface (film-forming surface 22) between prism 20 and metal film 30. Light exit surface 23 is a surface for making the light reflected by film-forming surface 22 exit to the outside of prism 20.

A shape of prism 20 is not specifically limited. In the present embodiment, the shape of prism 20 is a prismatic body having a bottom surface having a shape of a trapezoid. A surface corresponding to one base of the trapezoid is film-forming surface 22, a surface corresponding to one leg of the trapezoid is light entrance surface 21, and a surface corresponding to the other leg is light exit surface 23. It is preferable that the trapezoid of the bottom surface be an isosceles trapezoid. In such case, light entrance surface 21 and light exit surface 23 are symmetrical to each other, and s-wave components of excitation light cc are less likely to stagnate inside prism 20.

Light entrance surface 21 is formed so as to prevent excitation light cc from returning to excitation light irradiation unit 110. Where a light source of excitation light cc is a laser diode (hereinafter also referred to as "LD"), if excitation light cc returns to the LD, an excited state of the LD is disturbed, resulting in fluctuation in wavelength and output of excitation light cc. Therefore, in a scanning range with an ideal resonance angle or enhancement angle as a center, an angle of light entrance surface 21 is set so as to prevent excitation light cc from perpendicularly enter light entrance surface 21. "Resonance angle" here means an incident angle at which an amount of reflection light exiting from light exit surface 23 is smallest when an incident angle of excitation light cc to metal film 30 is scanned. Also, "enhancement angle" means an incident angle at which an amount of scattered light (hereinafter "scattered plasmon light") $\gamma$ having a wavelength that is the same as that of excitation light $\alpha$, the scattered light $\gamma$ being released upward of detection chip 10, is largest when an incident angle of excitation light $\alpha$ to metal film 30 is scanned. In the present embodiment, an angle between light entrance surface 21 and film-forming surface 22 and an angle between film-forming surface 22 and light exit surface 23 are both approximately 80°.

Here, the resonance angle (and the enhancement angle located near the resonance angle) are roughly determined according to the design of detection chip 10. Elements of the design include, e.g., a refractive index of prism 20, a refractive index of metal film 30, a thickness of metal film 30, an extinction coefficient of metal film 30 and a wavelength of excitation light $\alpha$. The resonance angle and the enhancement angle change depending on the measurement target substance captured on metal film 30 via a first capturing body, but the amount of the change is less than several degrees.

Prism 20 has no small degree of birefringence. Examples of a material of prism 20 include resins and glass. The material of prism 20 is preferably a resin having a refractive index of 1.4 to 1.6 and small birefringence.

Metal film 30 is disposed on film-forming surface 22 of prism 20. Consequently, an interaction (SPR) between photons of excitation light α falling on film-forming surface 22 under a total reflection condition and free electrons in metal film 30 occurs, resulting in production of localized field light (generally also called "evanescent light" or "near-field light") on a front surface of metal film 30.

A material of metal film 30 is not specifically limited as long as such material is a metal that can produce surface plasmon resonance. Examples of the material of metal film 30 include gold, silver, copper and aluminum and alloys thereof. A method for forming metal film 30 is not specifically limited. Examples of metal film 30 include sputtering, vapor deposition and plating. A thickness of metal film 30 is not specifically limited, but is preferably within a range of 30 to 70 nm.

Also, although not illustrated in FIG. 1, in the present embodiment, the first capturing body is fixed to the surface of metal film 30 that does not face prism 20 (front surface of metal film 30). The first capturing body is a substance including a recognition site for specifically binding to a measurement target substance in a sample, and the first capturing body is exposed inside liquid receiving section 41. Then, when a sample is provided inside liquid receiving section 41, the first capturing body and the measurement target substance come into contact with each other and thereby selectively bound to each other. In other words, the measurement target substance in the sample is disposed on metal film 30 via the first capturing body.

A type of the first capturing body fixed on metal film 30 is not specifically limited as long as such type of the first capturing body includes a recognition site for specifically binding to a measurement target substance. A method for fixing the first capturing body to metal film 30 is not specifically limited, and may be, for example, any of physisorption, chemical binding (amide coupling, reaction between Au and thiol, silane coupling), etc.

Also, a shape of flow channel cover 40 is not specifically limited as long as the shape includes a flow channel groove and can form liquid receiving section 41 for receiving a liquid, by wall surfaces and an upper surface of the flow channel groove, and metal film 30. A shape and a size of liquid receiving section 41 formed between flow channel cover 40 and metal film 30 are not also limited. Here, liquid receiving section 41 may be a space for temporarily retaining a liquid, such as, for example, a well, but is preferably a flow channel for liquid receiving section 41 to flow a liquid, from the perspective of, e.g., measurement efficiency. Where liquid receiving section 41 is a flow channel, opposite ends or one end of liquid receiving section 41 may be connected to a non-illustrated injection port and a non-illustrated discharge port formed in the upper surface of flow channel cover 40.

A part of flow channel cover 40, the part releasing fluorescence β and scattered plasmon light γ released from metal film 30 to the outside is formed of a material transparent to these types of light. Flow channel cover 40 may be entirely formed of a material transparent to the aforementioned types of light or partly formed of a material non-transparent to the aforementioned types of light. Examples of the material transparent to fluorescence β and scattered plasmon light γ include resins. Also, flow channel cover 40 is joined to metal film 30 or prism 20 via, for example, bonding using, e.g., a double-stick tape or an adhesive, laser welding, ultrasound welding or clamping using a clamp member.

Excitation light irradiation unit 110 applies excitation light α to detection chip 10 held by chip holder 142. At the time of measurement of fluorescence β or scattered plasmon light γ, excitation light irradiation unit 110 emits only p-waves relative to metal film 30 toward light entrance surface 21 so that an angle of incidence on metal film 30 is an angle that causes SPR. Here, "excitation light" refers to light that directly or indirectly excites a fluorescent substance. For example, excitation light α is light that upon being applied to metal film 30 via prism 20 at an angle that causes SPR, causes generation of a localized field light exciting a fluorescent substance on the front surface of metal film 30. Excitation light irradiation unit 110 includes light source unit 111, angle adjustment mechanism 112 and light source control section 113.

Light source unit 111 emits collimated excitation light α having a constant wavelength and a constant amount so as to form a substantially round-shaped irradiation spot on the back surface of metal film 30. Light source unit 111 includes, for example, a light source for excitation light α, a beam shaping optical system, an APC mechanism and a temperature adjustment mechanism (none of which is illustrated).

A type of the light source is not specifically limited, and as an example, may be a laser diode (LD). Other examples of the light source include a light-emitting diode, a mercury lamp and other laser light sources. If light emitted from the light source is not a beam, the light emitted from the light source is transformed into a beam by, e.g., a lens, a mirror or a slit. Also, if the light emitted from the light source is not monochromatic light, the light emitted from the light source is converted into monochromatic light by, e.g., a diffraction grating. Furthermore, if the light emitted from light source is not linearly polarized light, the light emitted from the light source is converted into linearly polarized light by, e.g., a polarizer.

The beam shaping optical system includes, for example, a collimator, a bandpass filter, a linear polarization filter, a half-wave plate, a slit, zoom means, etc. The beam shaping optical system may include all or part of these components. The collimator collimates excitation light α emitted from the light source. The bandpass filter makes excitation light α emitted from the light source be narrow-band light having a center wavelength only. This is because excitation light α from the light source has a certain wavelength distribution width. The linear polarization filter makes excitation light α emitted from the light source be completely linearly polarized light. The half-wave plate adjusts a direction of polarization of excitation light α so as to allow p-wave components to enter metal film 30. The slit and the zoom means adjust, e.g., a beam diameter and a contour shape of excitation light α so that a shape of an irradiation spot on the back surface of metal film 30 becomes a round shape of a predetermined size.

The APC mechanism controls the light source so that an output of the light source become constant. More specifically, the APC mechanism detects an amount of light branched from excitation light α via, e.g., a non-illustrated photo diode. Then, the APC mechanism controls the output of the light source to be constant, by controlling input energy via a recurrent circuit.

The temperature adjustment mechanism is, for example, a heater, a Peltier element or the like. The wavelength and energy of light emitted from the light source may vary depending on the temperature. Therefore, a temperature of the light source is controlled to be constant by the temperature adjustment mechanism to control the wavelength and energy of light emitted from the light source to be constant.

Angle adjustment mechanism 112 adjust an incident angle of excitation light cc to metal film 30 (interface between prism 20 and metal film 30 (film-forming surface 22)). Angle adjustment mechanism 112 rotates an optical axis of excitation light α and chip holder 142 relative to each other in order to apply excitation light α toward a predetermined position on metal film 30 at a predetermined incident angle via prism 20.

For example, angle adjustment mechanism 112 turns light source unit 111 with an axis orthogonal to the optical axis of excitation light α (axis perpendicular to the sheet of FIG. 1) as a center. In this case, the position of the turning axis is set so that even if the incident angle is scanned, the position of the irradiation spot on metal film 30 hardly changes. The position of the center of turning is set in the vicinity of an intersection point between optical axes of two excitation light beams α in opposite ends of the scanning range of the incident angle (between the irradiation position on film-forming surface 22 and light entrance surface 21), enabling minimization of deviation of the irradiation position.

As described above, from among incident angles of excitation light α to metal film 30, an angle at which an amount of scattered plasmon light γ becomes maximum is an enhancement angle. Setting an incident angle of excitation light α as the enhancement angle or an angle close to the enhancement angle enables measurement of high-intensity fluorescence β. A basic incidence condition of excitation light α is determined according to, e.g., the material and the shape of prism 20 of detection chip 10, the thickness of metal film 30 and/or the refractive index of the liquid inside liquid receiving section 41, but an optimum incidence condition slightly varies depending on, e.g., the type and the amount of the fluorescent substance inside liquid receiving section 41 and/or an error in shape of prism 20. Therefore, it is preferable to obtain an optimum enhancement angle for each measurement.

Light source control section 113 controls various devices included in light source unit 111 to control emission of excitation light α from light source unit 111. Light source control section 113 is formed of, e.g., a known computer or microcomputer that includes, for example, an arithmetic device, a control device, a storage device, an input device and an output device.

Fluorescence detection unit 120 detects fluorescence β generated by application of excitation light α to metal film 30. Also, as necessary, fluorescence detection unit 120 detects scattered plasmon light γ generated by application of excitation light α to metal film 30. Fluorescence detection unit 120 includes light receiving unit 121, position switching mechanism 122 and sensor control section 123.

Light receiving unit 121 is disposed in a direction normal to metal film 30 of detection chip 10. Light receiving unit 121 includes first lens 124, optical filter 125, second lens 126 and light receiving sensor 127.

First lens 124 is, for example, a condenser lens, and condenses light exiting from metal film 30. Second lens 126 is, for example, an image forming lens and forms an image of light condensed by first lens 124 on a light receiving surface of light receiving sensor 127. An optical path between the lenses is a substantially collimated optical path. Optical filter 125 is disposed between the lenses.

Optical filter 125 guides only fluorescent components to light receiving sensor 127 and removes excitation light components (scattered plasmon light γ) to detect fluorescence β at a high S (signal)/N (noise) ratio. Examples of optical filter 125 include an excitation light reflection filter, a short wavelength cutoff filter and a bandpass filter. Optical filter 125 is, for example, a filter including a multilayer film that reflects predetermined light components or a colored glass filter that absorbs predetermined light components.

Light receiving sensor 127 detects fluorescence β and scattered plasmon light γ. Light receiving sensor 127 has a high sensitivity enough to detect faint fluorescence β from a very small amount of measurement target substance. Light receiving sensor 127 is, for example, a photomultiplier tube (PMT), an avalanche photodiode (APD) or the like.

Position switching mechanism 122 switches a position of optical filter 125 at a position on the optical path or at a position outside the optical path in light receiving unit 121. More specifically, when light receiving sensor 127 detects fluorescence β, optical filter 125 is disposed on the optical path of light receiving unit 121, and when light receiving sensor 127 detects scattered plasmon light γ, optical filter 125 is disposed outside the optical path in light receiving unit 121.

Sensor control section 123 performs control for, e.g., detection of an output value of light receiving sensor 127, management of the sensitivity of light receiving sensor 127 according to the detected output value and change in sensitivity of light receiving sensor 127 for obtaining a proper output value. Sensor control section 123 is formed of, e.g., a known computer or microcomputer that includes, for example, an arithmetic device, a control device, a storage device, an input device and an output device.

Conveyance unit 140 conveys and fixes detection chip 10 to a measurement position or a liquid feeding position. Here, "measurement position" refers to a position at which excitation light irradiation unit 110 applies excitation light α to detection chip 10 and fluorescence detection unit 120 detects fluorescence β or scattered plasmon light γ generated as a result of the application. Also, "liquid feeding position" refers to a position at which liquid feeding unit 130 supplies a liquid into liquid receiving section 41 of detection chip 10 or a liquid inside liquid receiving section 41 of detection chip 10 is removed. Conveyance unit 140 includes conveyance stage 141 and chip holder 142. Chip holder 142 is fixed to conveyance stage 141 and detachably holds detection chip 10. Chip holder 142 has a shape that enables holding detection chip 10 and does not interrupt the optical path of excitation light α, fluorescence β and scattered plasmon light γ. For example, an opening for letting excitation light α, fluorescence β and scattered plasmon light γ through is provided in chip holder 142. Conveyance stage 141 moves chip holder 142 in one direction and a direction opposite to the one direction. Conveyance stage 141 also has a shape that does not interrupt the optical path of excitation light α, fluorescence β and scattered plasmon light γ. Conveyance stage 141 is driven by, for example, a stepping motor or the like.

Control section 150 controls angle adjustment mechanism 112, light source control section 113, position switching mechanism 122, sensor control section 123, liquid feeding pump drive mechanism 134 and conveyance stage 141. Control section 150 is formed of, e.g., a known computer or microcomputer including, for example, an arithmetic device, a control device, a storage device, an input device and an output device.

(Other embodiments of detection apparatus and detection system)

Although in the above, the description has been provided in terms of a structure in which sample collection well 135 includes liquid receiving section 135a and closure part 135b, it is only necessary that the opening area of the opening part of sample collection well 135 be smaller than the opening area of the opening part of sample holding well 131, and the structure of sample collection well 135 is not limited to the above structure. For example, sample collection well 135 may be, e.g., one formed of liquid receiving section 135a alone.

Furthermore, although in the above, the description has been provided in terms of a case where sample collection well 135 and chemical well 136 are different members, chemical well 136 after use, that is, chemical well 136 in which a labelling liquid, a cleaning liquid or the like was charged may be used as sample collection well 135. In this case, the area of an opening part of chemical well 136 is made to be smaller than the area of the opening part of sample holding well 131.

Figure 6C:
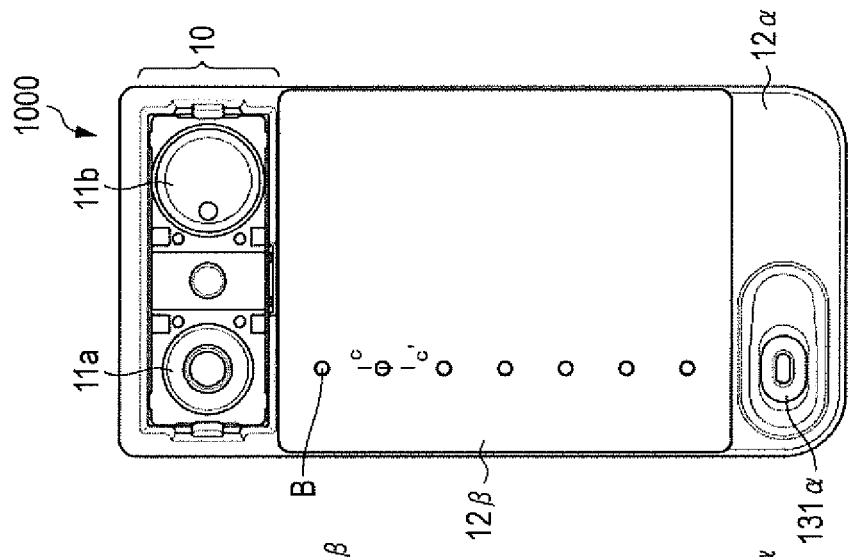
FIG. 6B is a plan view of the detection cartridge before use and FIG. 6C is a plan view of the detection cartridge after use.
Figure 6B:
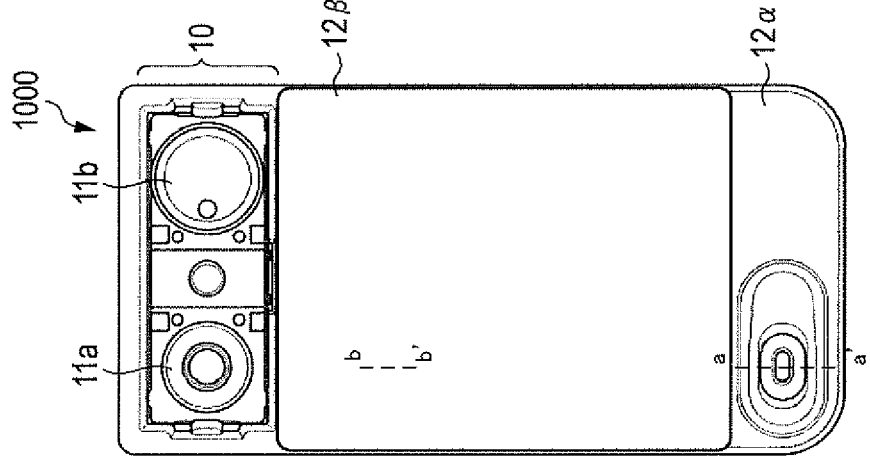
Figure 6A:
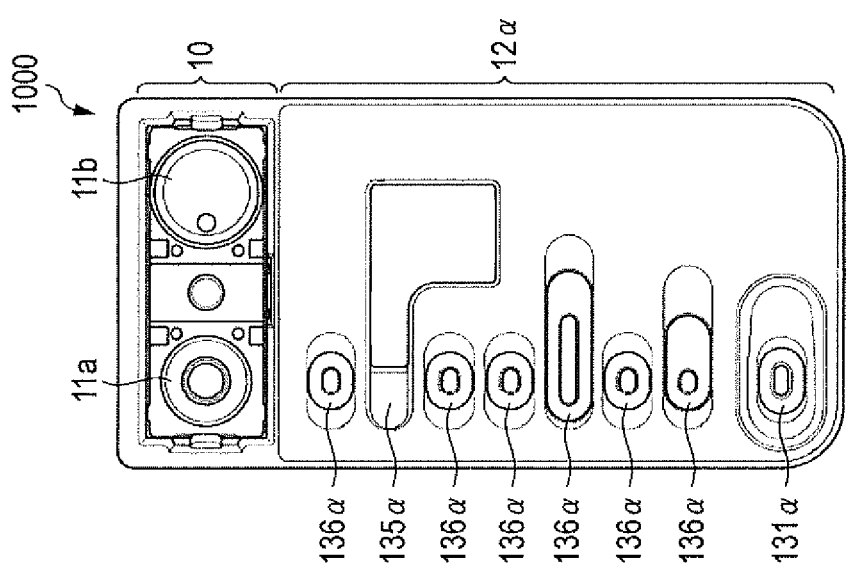
FIG. 6A is a plan view illustrating a configuration of a detection cartridge with a cartridge closure part thereof removed, the detection cartridge being to be loaded in a detection apparatus according to an embodiment of the present invention.
Figure 7:
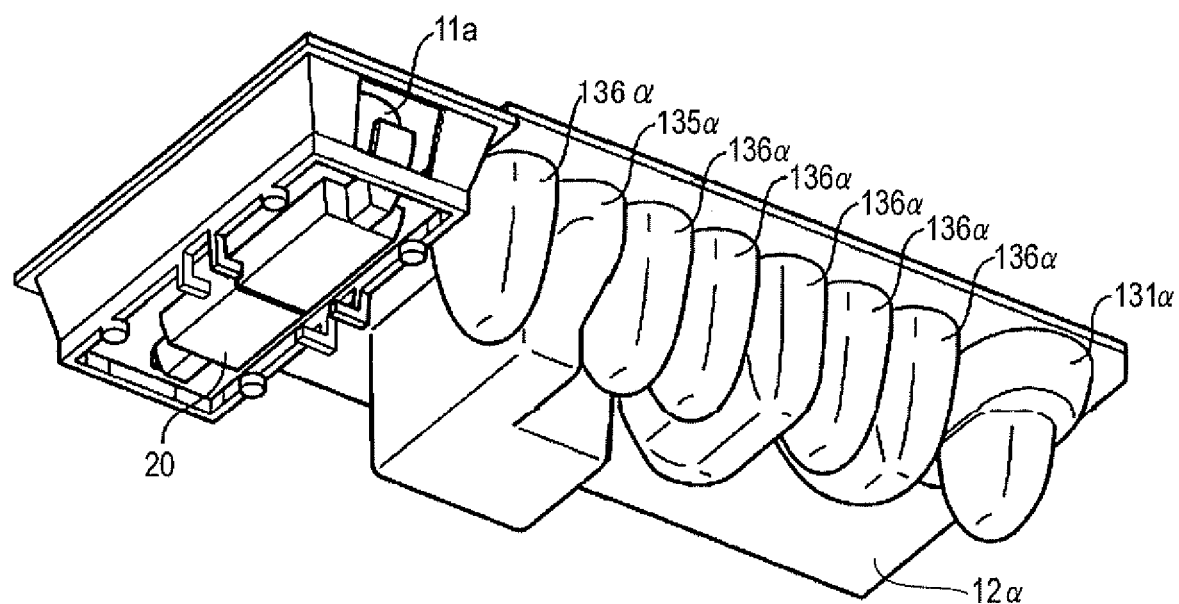
FIG. 7 is a perspective view illustrating a configuration of a back surface of the detection cartridge illustrated in FIGS. 6A, 6B and 6C.
Figure 8C:
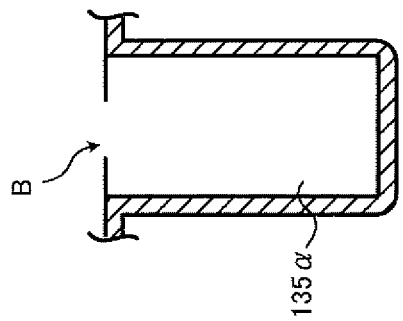
FIG. 8C is an enlarged cross-sectional view of the line c-c' part in the sample collection well in the detection cartridge illustrated in FIG. 6C.
Figure 8B:
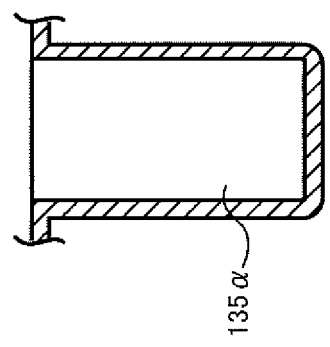
FIG. 8B is an enlarged cross-sectional view of the line b-b' part of the sample collection well in the detection cartridge illustrated in FIG. 6B.
Figure 8A:
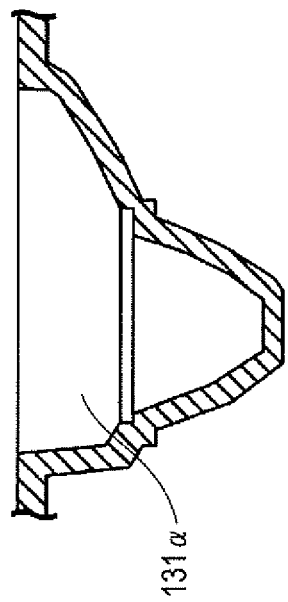
FIG. 8A is an enlarged cross-sectional view of the line a-a' part of the sample holding well in the detection cartridge illustrated in FIG. 6B.

Also, as described above, detection cartridge 1000 including detection chip 10, sample holding well 131, chemical well 136 and sample collection well 135 may be loaded into a detection apparatus to detect a detection target substance. In this case, detection cartridge 1000 is held by a holder included in the detection apparatus. FIGS. 6A to 8C illustrates an example configuration of detection cartridge 1000. FIG. 6A is a plan view of detection cartridge 1000 to be loaded in detection apparatus 100, with cartridge closure part 12β removed. FIG. 6B is a plan view of detection cartridge 1000 before use and FIG. 6C is a plan view of detection cartridge 1000 after use. FIG. 7 is a perspective view illustrating a configuration of a back surface of detection cartridge 1000. FIG. 8A is an enlarged cross-sectional view of the line a-a' part of sample holding section 131α (sample holding well) of detection cartridge 1000 illustrated in FIG. 6B, FIG. 8B is an enlarged cross-sectional view of the line b-b' part of sample collection section 135α (sample collection well) of detection cartridge 1000 illustrated in FIG. 6B, and FIG. 8C is an enlarged cross-sectional view of the line c-c' part of sample collection section 135β (sample collection well) of detection cartridge 1000 illustrated in FIG. 6C.

As illustrated in FIGS. 6A to 6C, detection cartridge 1000 includes detection chip 10, liquid receiving container 12α, and cartridge closure part 12β covering a part of liquid receiving container 12α, and detection chip 10 and liquid receiving section 12α are integrated.

Detection chip 10 may be detection chip 10 including prism 20, metal film 30 and flow channel cover 40, which has been described in the above embodiment, and thus, detailed description thereof will be omitted. As illustrated in FIGS. 6A to 6C, in the present embodiment, detection chip 10 includes liquid supply section 11a for injecting, e.g., a sample or a chemical, and retention section 11b for retaining a liquid, which are joined via the above-described liquid receiving section (not illustrated). Pipette nozzle 160 of the detection apparatus is inserted into liquid supply section 11a and injects a liquid such as a sample into liquid supply section 11a, whereby the liquid flows into the liquid receiving section and excess liquid is retained in liquid retention section 11b. Then, the liquid can be fed to/from the liquid receiving section by injection and suction of the liquid by pipette nozzle 160.

Liquid receiving container 12α in the present embodiment includes sample collection section 135α, sample holding section 131α and chemical holding section 136α, which correspond to liquid receiving section 135a of sample collection well 135, sample holding well 131 and chemical well 136 described above, respectively.

Sample collection section 135α included in liquid receiving container 12α includes a substantially L-shaped opening, and includes a sufficiently deep space for sufficiently receiving, e.g., remaining sample.

Sample holding section 131α included in liquid receiving container 12α includes a substantially elliptical opening part, and as illustrated in FIGS. 6A, 7 and 8A, includes a bottom surface, the area of which is smaller than that of the opening part, so that a sample received in sample holding section 131α can easily be harvested.

Furthermore, chemical holding section 136α included in liquid receiving container 12α includes a substantially elliptical opening part, and as illustrated in FIG. 7, includes a bottom surface, the area of which is smaller than that of the opening part, so that a chemical received in chemical holding section 136α can easily be harvested.

Cartridge closure part 12β of detection cartridge 1000 is a sheet-like member that covers chemical holding section 136α and sample collection section 135α, which corresponds to closure part 135b of sample collection well 135 described above. In the present embodiment, cartridge closure part 12β covers chemical holding section 136α and sample collection section 135α only, but as necessary, may cover a part or an entirety of sample holding section 131α. Closure part 12β may be a sheet formed of a member that is similar to that of closure part 135b of sample collection well 135 described above.

In the present embodiment, as illustrated in FIGS. 6B and 8B, in detection cartridge 1000 before use, cartridge closure part 12β includes no opening part. As illustrated in FIGS. 6C and 8C, after setting of detection cartridge 1000 in detection apparatus 100, pipette chip 160 is stuck into chemical holding section 136α or sample collection section 135α to form opening part B, but opening part B may be formed in cartridge closure part 12β in advance. Also, in the present embodiment, a substantially round opening part B having a diameter of 3 mm is formed in sample collection section 135α or chemical holding section 136α by a pipette chip (capacity of 250 μl), but the size of opening part B is not limited to such size.

(Detection method)

Figure 9:
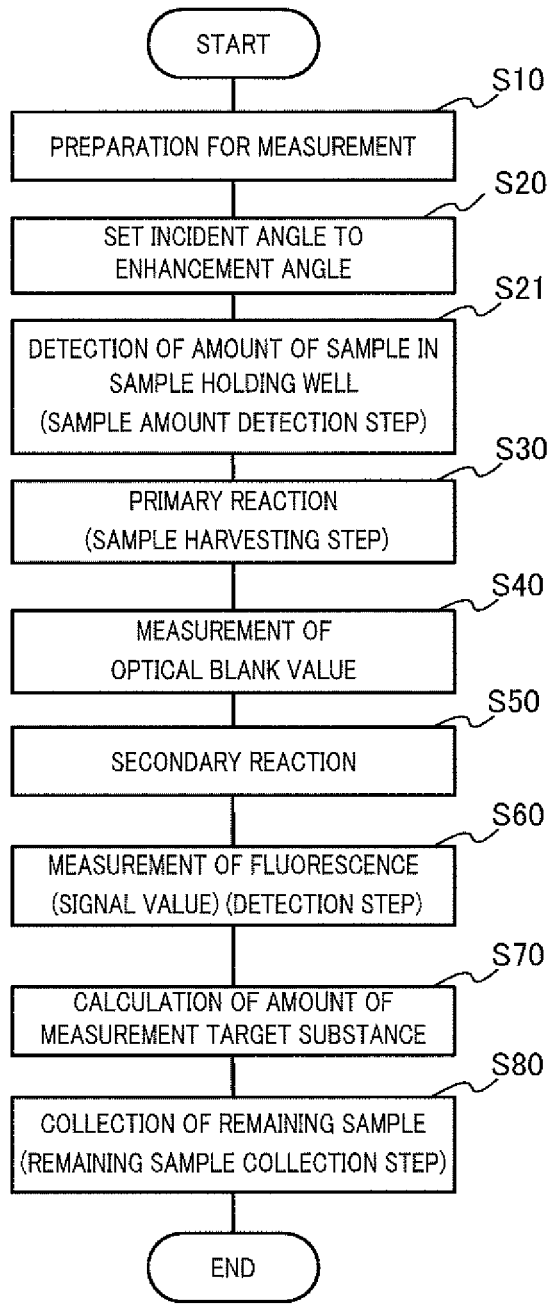
FIG. 9 is a flowchart of a detection method according to an embodiment of the present invention, the flowchart illustrating an example operation procedure of a detection method using a detection apparatus.

Next, a detection method according to the present embodiment will be described. FIG. 9 is a flowchart illustrating an example of an operation procedure of SPFS apparatus 100 when a detection method according to an embodiment of the present invention is performed.

First, preparation for measurement is made (step S10). More specifically, detection chip 10 described above is set in chip holder 142 of SPSF apparatus 100. Also, where a humectant is provided inside liquid receiving section 41 of detection chip 10, the inside of liquid receiving section 41 is cleaned to remove the humectant.

Next, an incident angle of excitation light α to metal film 30 (film-forming surface 22) of detection chip 10 is set to an enhancement angle (step S20). More specifically, control section 150 controls conveyance stage 141 to move detection chip 10 from a setting position to the measurement position. Subsequently, control section 150 controls light source control section 113 and angle adjustment section 112 to scan the incident angle of excitation light α to metal film 30 (film-forming surface 22) while applying excitation light α from light source unit 111 to a predetermined position on metal film 30 (film-forming surface 22). Here, control section 150 controls position switching mechanism 122 to move optical filter 125 to the outside of the optical path of light receiving unit 121. Concurrently, control section 150 controls sensor control section 123 to detect scattered plasmon light γ via light receiving sensor 127. Control section 150 obtains data including a relationship between the incident angle of excitation light α and an intensity of scattered plasmon light γ. Then, control section 150 analyzes the data and determines an incident angle (enhancement angle) at which the intensity of scattered plasmon light γ becomes maximum. Finally, control section 150 controls angle adjustment mechanism 112 to set the incident angle of excitation light α to metal film 30 (film-forming surface 22) to the enhancement angle.

Here, the above enhancement angle is determined according to, e.g., the material and the shape of prism 20, the thickness of metal film 30 and/or the refractive index of the liquid inside liquid receiving section 41, but slightly varies depending on various factors such as the type and the amount of the liquid inside liquid receiving section 41 and/or an error in shape of prism 20. Thus, it is preferable to determine an enhancement angle each time measurement is performed. The enhancement angle is determined in the order of around 0.1°.

Next, before a later-described sample harvesting step (step S30) or simultaneously with harvesting of a sample in the sample harvesting step (step S30), an amount of sample held by sample holding well 131 is detected (sample amount detection step (step S21)). More specifically, the distal end of pipette chip 160 is brought close to a liquid surface of the sample inside sample holding well 131 while air is sucked from the distal end of pipette chip 160 in liquid harvesting section 137. Then, change in suction pressure of pipette chip 160 is measured by the suction pressure measurement device in liquid feeding pump drive mechanism 134 to identify a timing of a change in suction pressure (pipette chip 160 reaching the liquid surface) and a position in an axial direction of pipette chip 160 at that timing. Then, based on the level in the axial direction of pipette chip 160, the level of the liquid surface inside sample holding well 131 is identified to identify an approximate amount of sample injected in sample holding well 131.

Here, types of the sample held by sample holding well 131 and the measurement target substance are not specifically limited. Examples of the sample include body fluids such as blood, serum, blood plasma, urine, snivel, saliva and semen, and diluted solutions thereof. Also, examples of the measurement target substance included in the sample include nucleic acids (such as DNA and RNA), proteins (such as polypeptide and oligopeptide), amino acids, carbohydrate and lipid, and modifiers thereof.

Next, liquid harvesting section 137 is further controlled to harvest a sample from sample holding well 131. Then, the sample is provided to liquid receiving section 41 of detection chip 10 and a measurement target substance contained in the sample is specifically bound to (subjected to a primary reaction with) the first capturing body fixed on metal film 30 inside detection chip 10 (sample harvesting step (step S30)). After the primary reaction, liquid harvesting section 137 is controlled to harvest an excess sample from liquid receiving section 41 and move the excess sample to sample collection well 135. Also, after the measurement target substance binding, liquid harvesting section 137 is further controlled to provide, e.g., a buffer solution into liquid receiving section 41. Consequently, the inside of liquid receiving section 41 is cleaned to remove, e.g., free measurement target substance.

Next, an optical blank value is measured (step S40). More specifically, control section 150 controls conveyance stage 141 to move detection chip 10 from the setting position to the measurement position. Subsequently, control section 150 controls light source control section 113 to cause excitation light α to be emitted at the enhancement angle from light source unit 111 toward metal film 30 (film-forming surface 22). Concurrently, control section 150 controls sensor control section 123 to detect an amount of light via light receiving sensor 127 and records the amount as a blank value.

Furthermore, a second capturing body labelled by a fluorescent substance is bound to (subjected to a secondary reaction with) the measurement target substance bound to the first capturing body on metal film 30 (step S50). More specifically, control section 150 controls conveyance stage 141 to move detection chip 10 from the measurement position to the liquid feeding position. Subsequently, control section 150 controls liquid harvesting section 137 to provide a labelling liquid containing the second capturing body, which is held by chemical well 136, into liquid receiving section 41. Here, the second capturing body is a substance that specifically binds to a site that is different from a site that the first capturing body is specifically bound to, in the measurement target substance. Also, the fluorescent substance is bound to the second capturing body. Therefore, upon the labelling liquid being provided into liquid receiving section 41, the second capturing body is specifically bound to (subjected to a secondary reaction with) the measurement target substance bound to the first capturing body, and the measurement target substance is thereby indirectly labelled by the fluorescent substance. After the secondary reaction, liquid harvesting section 137 is controlled to harvest an excess labelling liquid from liquid receiving section 41 and move the excess labelling liquid to sample collection well 135. Subsequently, liquid feeding unit 130 is further controlled to provide, e.g., a buffer solution into liquid receiving section 41. Consequently, the inside of liquid receiving section 41 is cleaned and, e.g., free second capturing body is thereby removed.

Next, in a state in which the measurement target substance labelled by the fluorescent substance is disposed on a bottom surface (metal film 30) of liquid receiving section 41 via the first capturing body, excitation light α is applied to metal film 30 (film-forming surface 22) at the enhancement angle through prism 20. Then, a value of fluorescence from the fluorescent substance labelling the measurement target substance is measured (detection step (step S60)). More specifically, control section 150 controls conveyance stage 141 to move detection chip 10 from the liquid feeding position to the measurement position. Subsequently, control section 150 controls light source control section 113 to cause excitation light α to be emitted from light source unit 111 toward metal film 30 (film-forming surface 22). Concurrently, control section 150 controls sensor control section 123 to detect an amount of light having a wavelength that is the same as that of fluorescence β via light receiving sensor 127.

Furthermore, a signal value indicating existence or an amount of the measurement target substance is calculated (step S70). A fluorescence value mainly includes fluorescent components (signal value) derived from a fluorescent substance labelling a measurement target substance, and an optical blank value. Therefore, control section 150 can obtain a signal value correlating with an amount of measurement target substance by subtracting the optical blank value obtained in step S40 from the fluorescence value obtained in step S60. Then, control section 150 converts the signal value into, e.g., an amount and/or a density of the measurement target substance according to a calibration curve prepared in advance.

Next, control section 150 controls liquid harvesting section 137 to move a remaining sample remaining in sample holding well 131 to sample collection well 135 (remaining sample collection step (step S80)). More specifically, after the remaining sample remaining in sample holding well 131 is harvested by liquid harvesting section 137, the remaining sample is discharged into sample collection well 135. At this time, control section 150 controls liquid feeding unit 130 to repeat remaining sample harvesting and discharge until the amount of remaining sample in sample holding well 131 becomes equal to or below a desired amount, preferably zero.

Also, in the remaining sample collection step (step S80) in the present embodiment, when a remaining sample is collected from sample holding well 131 for a first time, control section 150 controls liquid harvesting section 137 to insert pipette chip 160 into sample holding well 131 while sucking air from the distal end of pipette chip 160. Consequently, even if there is a large amount of remaining sample remaining in sample holding well 131, the remaining sample can reliably be sucked into pipette chip 160 without spilling from sample holding well 131.

Also, in the remaining sample collection step (step S80) in the present embodiment, control section 150 identifies the amount of remaining sample remaining inside sample holding well 131 at the time of the remaining sample collection step (step S80), based on the sample amount detected in the above-described sample amount detection step for the sample amount (step S21) and the amount of the sample harvested in the sample harvesting step. Then, based on the remaining sample amount, control section 150 drives liquid harvesting section 137. More specifically, control section 150 manages, e.g., the number of times of harvesting a remaining sample from sample holding well 131 and an insertion position of pipette chip 160. Determining the number of times of harvesting a remaining sample from sample holding well 131 according to the remaining sample amount enables reduction in number of times of idle suction from sample holding well 131 by pipette chip 160 and thus enables enhancement in work efficiency. Furthermore, insertion of pipette chip 160 can suppress the remaining sample spilling from sample holding well 131. Here, control section 150 may manage only either one of determination of the number of times of harvesting a remaining sample and determination of the insertion position of pipette chip 160; however, from the perspective of work efficiency and the perspective of, e.g., preventing the remaining sample from splattering, it is preferable that control section 150 manage the both.

Other Embodiments

Although in the above, the embodiment in which in the remaining sample collection step (step S80), e.g., the number of times of harvesting a remaining sample from sample holding well 131 and the insertion position of pipette chip 160 are determined based on the sample amount detected in the sample amount detection step (step S21) has been described, no sample amount detection step (step S21) may be performed. In this case, in the remaining sample collection step (step S80), the remaining sample in the sample holding well 131 can be fully moved to the sample collection well by repeating remaining sample harvesting and discharge a fixed number of times regardless of the amount of the remaining sample. Also, the remaining sample in sample holding well 131 can be fully moved to the sample collection well by harvesting a sample from sample holding well 131 while measuring suction pressure of pipette chip 160 via the suction pressure measurement device in liquid feeding pump drive mechanism 134, and repeating remaining sample harvesting and discharge until pipette chip 160 has no longer suction pressure.

Also, although in the above, in the sample amount detection step (step S21), the amount of sample inside sample holding well 131 is identified based on change in suction pressure of pipette chip 160, the amount of sample inside sample holding well 131 may be detected optically, for example, via a CCD camera or the like.

Furthermore, although the above description has been provided in terms of the case where the remaining sample collection step (step S80) is performed after calculation of the amount of measurement target substance (step S70), the remaining sample collection step (step S80) may be performed at any stage after harvesting a sample from sample holding well 131 and providing the sample to detection chip 10. Therefore, for example, the remaining sample collection step (step S80) may be performed at any stage in and after the sample harvesting step (step S30).

Figure 10:
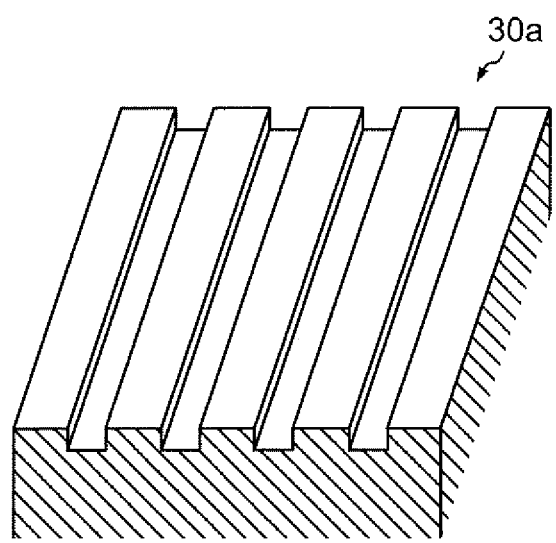
FIG. 10 is a perspective view of a metal film including a diffraction grating.

Also, the above embodiment has been described in terms of a prism coupling (PC)-SPFS (detection method) and a detection apparatus in which prism 20 with metal film 30 formed thereon is used to couple photons and surface plasmons. However, the detection method and the detection chip according to the present invention are not limited to this type. FIG. 10 is a perspective view of metal film 30a including a diffraction grating. In the detection method and the detection apparatus according to the present invention, as illustrated in FIG. 10, a detection chip including metal film 30a including a diffraction grating may be used. In this case, also, it is possible to couple photons and surface plasmons to release scattered plasmon light γ from metal film 30a. In this case, no prism 20 is needed. Also, light irradiation unit 110 is disposed on the metal film 30a side of the detection chip, and in a step of detection of fluorescence β and a step of detection of scattered plasmon light γ, excitation light α is applied toward the diffraction grating.

Also, although the above embodiment has been described in terms of a detection method and a detection apparatus using an SPFS apparatus, the detection method and the detection apparatus are not limited to these examples. The measurement target substance detection method is applicable also to, e.g., ELISA, RIfS, SPR and QCM.

Effects

As described above, in a general detection apparatus, when a used sample holding well is to be removed or moved, a remaining sample remaining in sample holding well sometimes spills or splatters. However, according to the above-described embodiment, a remaining sample is moved from a used sample holding well to a sample collection well and the sample is less likely to spill from the sample collection well. Therefore, when a user removes the sample holding well and the sample collection well from the detection apparatus or disposes of the sample holding well and the sample collection well, the remaining sample is prevented from spilling or splattering.

INDUSTRIAL APPLICABILITY

The detection method and the detection apparatus according to the present invention enables removing a remaining sample and a sample holding well that holds the remaining sample from the detection apparatus without causing a biohazard and safely collecting the remaining sample and the sample holding well. Therefore, the detection method and the detection apparatus according to the present invention are very effective as a detection apparatus, a detection system and a detection method for detecting various types of detection target substances.

REFERENCE SIGNS LIST 10 detection chip
20 prism
21 light entrance surface
22 film-forming surface
23 light exit surface
30 metal film
40 flow channel cover
41 liquid receiving section
100 SPFS apparatus
110 light irradiation unit
111 light source unit
112 angle adjustment mechanism
113 light source control section
120 received light detection unit
121 light receiving unit
122 position switching mechanism
123 sensor control section
124 first lens
125 optical filter
126 second lens
127 light receiving sensor
130 liquid feeding unit
131 sample holding well
132 pump
134 liquid feeding pump drive mechanism
135 sample collection well
136 chemical well
137 liquid harvesting section
140 conveyance unit
141 conveyance stage
142 chip holder
150 control section
160 pipette chip
1000 detection cartridge
1331 plunger pump
1332 pump nozzle
α excitation light
β fluorescence
γ scattered plasmon light

The invention claimed is:

1. A detection method comprising:
harvesting a sample from a sample holding well that holds a sample and moving the sample to a detection chip that captures a detection target substance contained in the sample, via a liquid harvester;
harvesting a chemical held in a chemical well and moving the chemical to the detection chip via the liquid harvester;
detecting the detection target substance captured by the detection chip, via a detector; and
harvesting a remaining sample from the sample holding well and moving the remaining sample to the chemical well that serves as a sample collection well, via the liquid harvester,
wherein after harvesting the remaining sample, an opening area of an opening part provided in the chemical well is smaller than an opening area of an opening part included in the sample holding well.

2. The detection method according to claim 1, wherein:
the sample collection well includes a liquid receiving section including an opening and a sheet-like closure part; and
after harvesting the remaining sample, the opening part provided in the sample collection well is a hole or a cut formed in a part of the closure part.

3. The detection method according to claim 2, wherein the opening part of the sample collection well is formed by piercing the closure part of the sample collection well with the liquid harvester.

4. The detection method according claim 1, wherein harvesting the remaining sample is performed after detecting the detection target substance.

5. The detection method according to claim 1, wherein an absorbent that absorbs a sample is disposed inside the sample collection well.

6. The detection method according to claim 1, wherein before harvesting the sample, a sample amount detection step of detecting an amount of the sample held in the sample holding well is performed.

7. The detection method according to claim 6, wherein a number of times of harvesting a remaining sample from the sample holding well via the liquid harvester when harvesting the remaining sample is changed according to the amount of the sample detected when harvesting the sample from the sample holding well.

8. The detection method according to claim 6, wherein an insertion position for the liquid harvester to be inserted in the sample holding well when harvesting the remaining sample is changed according to the sample amount detected when harvesting the sample from the sample holding well.

9. A detection system comprising:
a sample holding well that holds a sample;
a sample collection well that collects a remaining sample from the sample holding well;
a liquid harvester that harvests a sample from the sample holding well;
a detection chip that captures a detection target substance contained in the sample;
a detection section that detects the detection target substance captured by the detection chip;
a chemical well that holds a chemical;
wherein the chemical is harvested and moved to the detection chip via the liquid harvester,
wherein the remaining sample is moved from the sample holding well to the chemical well that serves as the sample collection well via the liquid harvester, and
wherein a remaining sample in the sample holding well after harvesting of the sample from the sample holding well and provision of the sample to the detection chip by the liquid harvester is harvested and collected into the sample collection well by the liquid harvester, the chemical well including an opening part, an opening area of the opening part being smaller than an opening area of an opening part of the sample holding well.

10. A detection apparatus comprising:
- a holder capable of holding a detection cartridge including a sample holding well that holds a sample, a sample collection well that collects a remaining sample from the sample holding well and a detection chip that captures a detection target substance contained in a sample;
- a detection section that detects the detection target substance captured by the detection chip held by the holder;
- a liquid harvester that harvests a sample from the sample holding well; and
- a control section that controls the liquid harvester;
- a chemical well that holds a chemical,
- wherein the chemical is harvested and moved to the detection chip via the liquid harvester,
- wherein the remaining sample is moved from the sample holding well to the chemical well that serves as the sample collection well via the liquid harvester, and
- wherein the control section controls the liquid harvester to harvest a sample held in the sample holding well and provide the sample to the detection chip and then harvest a remaining sample in the sample holding well and provide the remaining sample to the sample collection well, the chemical well including an opening part, an opening area of the opening part being smaller than an opening area of an opening part of the sample holding well.

* * * * *